United States Patent [19]

Sawyer

[11] Patent Number: 5,339,618
[45] Date of Patent: Aug. 23, 1994

[54] PULL CHAIN ADAPTER

[76] Inventor: Gerald F. Sawyer, 2862 Tree Top Rd., Dacula, Ga. 30211

[21] Appl. No.: 129,436

[22] Filed: Sep. 29, 1993

[51] Int. Cl.$^5$ .............................................. F16G 15/00
[52] U.S. Cl. ........................................ 59/93; 428/28; 362/404
[58] Field of Search .................. 362/384, 404; 428/28; 59/78, 93

[56] References Cited

U.S. PATENT DOCUMENTS

| | | | |
|---|---|---|---|
| 1,189,101 | 6/1916 | Hannan | 59/93 |
| 1,444,296 | 2/1923 | Alter | 59/93 |
| 2,117,137 | 5/1938 | Blatz | 59/93 |
| 2,232,512 | 2/1941 | Clifford | 428/28 |
| 4,956,758 | 9/1990 | Aubrey et al. | 362/404 |

Primary Examiner—David Jones
Attorney, Agent, or Firm—James B. Middleton

[57] ABSTRACT

An adapter is used to connect a conventional lamp shade finial to a pull chain for a fan or the like. The adapter has a length of bead chain, and a threaded member on one end of the chain. A larger bead prevents the threaded member from coming off the chain; and, the threaded member is sized to be received by the standard base for a lamp shade finial. A lip on the threaded member limits the insertion of the threaded member into the finial base. The other end of the length of bead chain has a connector to connect the adapter to the existing pull chain, and this may be a conventional bead chain connector.

5 Claims, 1 Drawing Sheet

U.S. Patent     Aug. 23, 1994     5,339,618
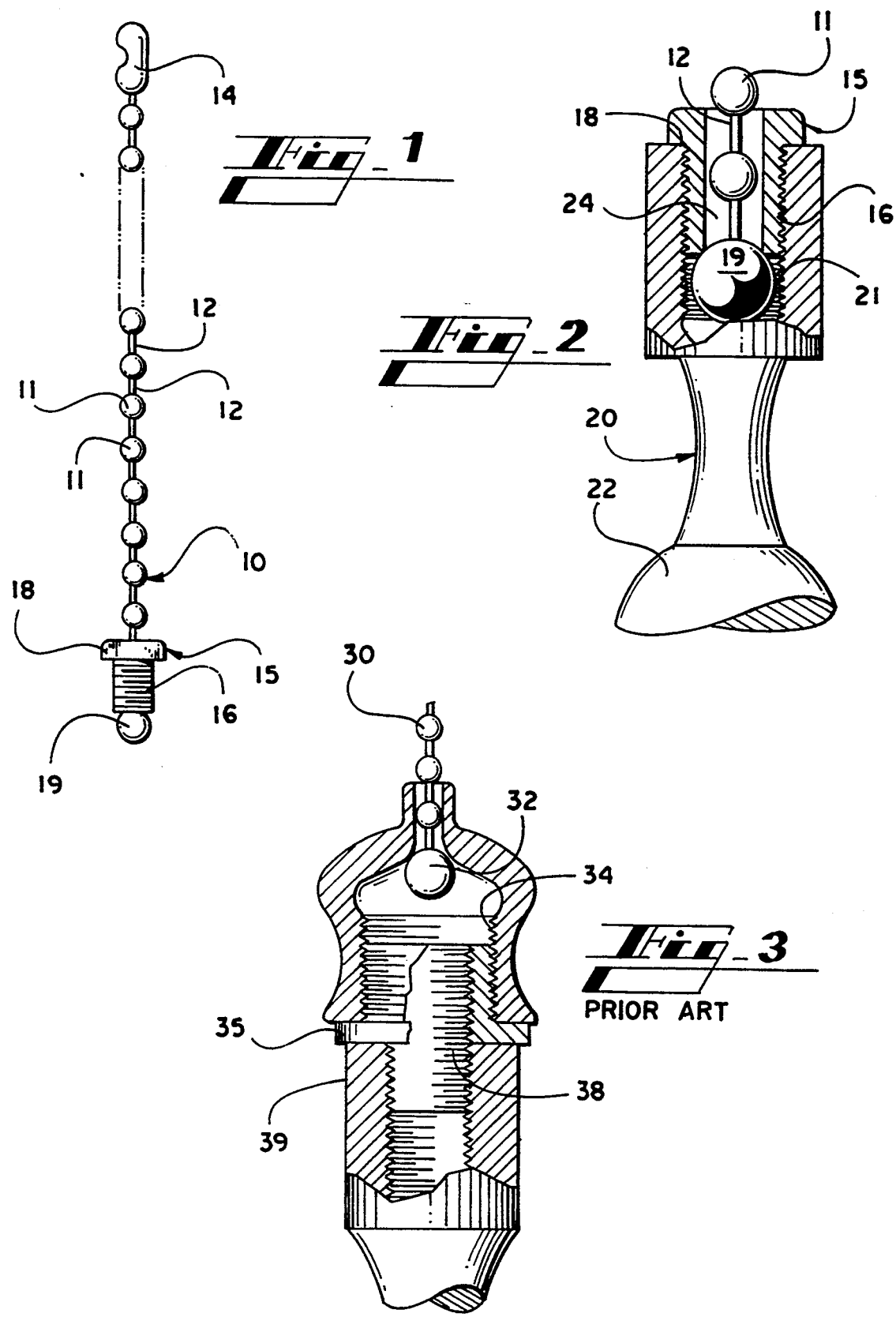

PULL CHAIN ADAPTER

BACKGROUND OF THE INVENTION

1. Field of the Invention

This invention relates generally to decorative pulls, and is more particularly concerned with an adapter for attaching a decorative pull to a pull chain.

2. Discussion of the Prior Art

There have been many efforts to provide a decorative pull to a pull chain. Such a pull serves the practical purpose of weighting the end of the cord and providing a device that is easy to grasp, and serves the decorative purpose of matching the pull to the general decor in both style and colors. The most common pulls are attached by the manufacturer of the device having the pull cord, and of course such pulls are not easily replaceable. Replacement is usually by replacement of the pull cord, the replacement having a different decorative pull. While this changes the pull, one is limited to the range of pulls available.

An adapter has been marketed for allowing a lamp shade finial to be attached to a pull chain, and such an adapter opens a very wide range of designs and colors for decorative pulls. The disadvantage of the prior art adapter is that it is large, complex and relatively expensive. In some cases, the adapter is so large as to detract from the pull. The prior art device is assembled of several parts that must be glued together, so both parts and labor are more expensive.

SUMMARY OF THE INVENTION

The present invention provides an adapter to allow a conventional lamp shade finial to be attached to a pull chain, the adapter comprising a very simple threaded member carried by a bead chain which can be connected to a pull chain. The threaded member has an external thread that will be threadedly received by the conventional threaded base of a lamp shade finial. The threaded member defines a hole therethrough for slidably receiving a bead chain; and, the bead chain includes a terminal bead that is too large to pass through the hole in the threaded member. The opposite end of the chain may be provided with a conventional bead chain connector so the chain can be connected to an existing pull chain.

Thus, the present invention provides an extension chain for pull chains, the substitute chain being very simple and easy to construct, and having a threaded member for receiving any conventional lamp shade finial.

BRIEF DESCRIPTION OF THE DRAWINGS

These and other features and advantages of the present invention will become apparent from consideration of the following specification when taken in conjunction with the accompanying drawings in which:

FIG. 1 is a front elevational view of a pull chain adapter made in accordance with the present invention;

FIG. 2 is an enlarged, diametrical cross-sectional view through the threaded member of FIG. 1, and showing a finial base received thereon; and, FIG. 3 is a cross-sectional view showing the prior art pull chain adapter.

DETAILED DESCRIPTION OF THE EMBODIMENT

Referring now more particularly to the drawings, and to that embodiment of the invention here presented by way of illustration, FIG. 1 shows a pull chain adapter including a conventional bead chain 10. The chain is made up of a plurality of beads 11 connected by wires 12. At one end of the bead chain 10 there is a connector 14, and at the opposite end is a threaded member 15.

The connector 14 is of a type well known to those skilled in the art, and is adapted to receive a bead at each end thereof. By placing a bead of each of two chains in the connector 14, the two chains will be joined.

The threaded member 15 includes a threaded body 16, and a lip 18. The lip 18 is at one end of the body, and extends outwardly beyond the diameter of the threaded body 16. The member 15 defines a bore therethrough for slidably receiving the chain 10, and the chain 10 has a larger terminal bead 19 that will not pass through the bore in the member 15.

The construction of the threaded member 15 is shown in more detail in FIG. 2 of the drawings. Here it can be seen that the threaded body 16 is of an appropriate size to be received by a conventional finial base 20. Those skilled in the art will realize that the finial base 20 has an internally threaded opening 21 that usually receives the threaded stud on a lamp shade harp, and the finial per se designated at 22 is fixed to the finial base 20. Thus, by providing a threaded member 15 on a pull chain which is the proper size to be received by a finial base, any conventional finial can be easily attached to the pull chain.

With continued attention to FIG. 2 of the drawings, it will be understood that the bead chain 10 is easily received through the bore 24 in the threaded member 15; but, the terminal bead 19 is large enough that it will not pass through the bore 24. It must be understood, however, that the larger bead 19 is receivable within the threaded opening 21 of the finial base 20. The result is that the very simple construction shown in FIG. 1 of the drawings can receive any conventional lamp shade finial. One can simply attach the bead chain connector 14 to the existing pull chain, and then attach any desired finial 22 to the member 15.

For several years, the only means available for adapting a lamp shade finial to a pull chain has been the device shown in FIG. 3 of the drawings. The present inventor originated the device shown in FIG. 3; and, others in the industry copied the device rather than design their own, in spite of the complexity of the device. The present inventor then made an effort to design a device to compete effectively with the competition, and such efforts resulted in the device of the present invention.

In FIG. 3, the chain is received through a hole in a pyramid knob 31, the chain 30 having a larger bead 32 to prevent removal of the chain. The threaded opening 34 in the pyramid knob 31 is too large for an appropriately sized nipple for a finial, so a bushing 35 is received in the opening 34. The bushing 35, in turn, has an opening 36 that is sized to receive a nipple 38. The nipple 38 is of the proper size to be received by a conventional lamp shade finial base 39. The finial base 39 is broken away so the finial itself is not shown, but those skilled in the art will understand that the construction of the finial is the same as is shown and described in conjunction with FIG. 2 of the drawings.

In addition to the requirement for the several parts described above, it is also necessary to assemble the device shown in FIG. 3 so that it will not come apart inadvertently. As a result, the bushing 35 is glued in place within the pyramid knob 31, and the nipple 38 is glued in place within the opening 36 of the bushing 35. Gluing provides a secure piece, but requires labor, hence an increased price for the final product.

It should therefore be understood by those skilled in the art that the device of the present invention provides a considerable improvement over the prior art pull chain adapter. The present invention requires few parts; and, no gluing or the like is required. As a result, the device of the present invention can be manufactured at less cost than the prior art device. Additionally, the prior art device is large enough that it sometimes overshadows the preferred finial. The device of the present invention, on the other hand, is small enough that it is virtually invisible when in use.

It will of course be understood by those skilled in the art that the embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim

1. An adapter for attaching a decorative pull to a pull chain for a fan, said adapter comprising a length of bead chain, connecting means on one end of said length of bead chain for connecting said adapter to said pull cord, and a threaded member on the opposite end of said length of bead chain, said threaded member defining a bore therethrough of a size just sufficient to receive said bead chain and receiving said bead chain therethrough threads externally of said threaded member, and a terminal bead on said opposite end of said length of bead chain, said terminal bead having a diameter greater than the diameter of said bore and less than the diameter of said threads externally of said threaded member.

2. An adapter as claimed in claim 1, wherein said decorative pull comprises a lamp shade finial, and said threaded member is sized to be received by said finial.

3. An adapter as claimed in claim 2, said threaded member further including a lip for limiting motion of said threaded body into said finial.

4. An adapter as claimed in claim 3, wherein said threads externally of said threaded member are concentric with said bore.

5. An adapter as claimed in claim 4, wherein said connecting means comprises a bead chain connector for attaching said length of bead chain to a like bead chain.

* * * * *